United States Patent [19]

Weber

[11] Patent Number: 4,705,289

[45] Date of Patent: Nov. 10, 1987

[54] DUAL LOAD TRAILER

[76] Inventor: Robert W. Weber, P.O. Box 193, Hamilton, Tex. 76531

[21] Appl. No.: 837,378

[22] Filed: Mar. 3, 1986

[51] Int. Cl.⁴ .............................................. B60P 3/08
[52] U.S. Cl. .............................. 280/414.1; 296/1 A; 414/481
[58] Field of Search ................. 280/400, 414.1, 414.3; 414/481, 494, 477, 480; 410/4, 6, 25, 26; 296/1 A

[56] References Cited

U.S. PATENT DOCUMENTS

| | | | |
|---|---|---|---|
| 2,793,774 | 5/1957 | Lovegreen | 280/414.1 |
| 3,718,227 | 2/1973 | Swift | 410/25 |
| 3,970,203 | 7/1976 | Watson | 296/1 A |
| 4,068,772 | 1/1978 | Prudhomme | 414/477 |
| 4,221,420 | 9/1980 | Vencill | 280/414.1 |
| 4,420,165 | 12/1983 | Goodin | 410/26 |
| 4,469,346 | 9/1984 | Low | 410/26 |
| 4,560,316 | 12/1985 | Daniels | 280/414.1 |

Primary Examiner—John J. Love
Assistant Examiner—Donn McGiehan
Attorney, Agent, or Firm—Kanz, Scherback & Timmons

[57] ABSTRACT

A dual load trailer for simultaneously transporting a first vehicle in an upper position and a second vehicle in a lower position, with the upper vehicle inclined towards the front end of the trailer and with at least a portion of the first vehicle below the top of the second vehicle.

22 Claims, 13 Drawing Figures

DUAL LOAD TRAILER

FIELD OF THE INVENTION

This invention relates generally to trailers for transporting multiple loads and more specifically to a trailer for transporting two vehicles simultaneously.

BACKGROUND OF THE INVENTION

Trailers have been used in the past for simultaneously transporting multiple loads. Specifically, such trailers are used to transport two or more vehicles such as a boat, automobile, camper, tent trailer or the like, when it is not possible or convenient to transport each separately. For instance, U.S. Pat. No. 3,718,227, issued to Swift, shows a combination boat and automobile trailer. A portion of the trailer frame may be used to raise the boat and secure it in an elevated position. An automobile may then be driven onto the trailer beneath the boat and secured thereon for transportation. The trailer is then attached to a towing vehicle such as a truck, camper, automobile or the like.

However, the trailer in the Swift patent exhibits certain limitations typical of conventional dual load trailer designs. By elevating one of the vehicles above the other, the center of gravity of the trailer is raised and the stability of the trailer is decreased. This creates obvious safety problems, particularly as the towing speed increases. The elevated profile of the trailer also increases wind resistance as the trailer is being pulled, increasing the load on the vehicle towing the trailer. The elevated profile of the trailer also interferes with with entry into structures such as garages or public parking ramps for storage.

SUMMARY OF THE INVENTION

This invention provides an improved dual load trailer which includes a frame supported on at least one axle and set of wheels. The frame defines a front end adapted for attachment to a vehicle for towing the trailer, and a back end adapted for loading and unloading the vehicles to be transported. An upper platform is mounted on the frame for supporting one of the vehicles. A pair of parallel, inclined laterally spaced ramps are mounted on the frame and extend from the upper platform to the back edge of the frame, enabling the vehicle to reach the upper platform. A pair laterally spaced loading members are pivotally mounted on the back edge of the frame in alignment with the ramps leading to the upper platform. The loading members may be lowered to enable a vehicle to move onto the ramps. Once the vehicle has been loaded onto the upper platform, a second vehicle is loaded onto a lower platform mounted on the frame between the ramps and beneath the upper platform. The loading members are then secured in a raised position for transporting the vehicles on the trailer.

The present invention provides for the upper vehicle to be positioned with respect to the lower vehicle such that the overall profile and center of gravity of the trailer is lowered. This is accomplished by situating the upper platform so that the upper vehicle is inclined towards the front of the trailer and preferably with the wheels of the upper vehicle straddling and at least partially below the top of the lower vehicle.

Means are provided to secure both of the vehicles on their respective platforms for transporting the trailer with vehicles loaded thereon. In one embodiment of the invention, at least one pair of laterally spaced support members are pivotally attached at one end to the frame of the trailer, and may be raised and attached to the upper vehicle when loaded on the upper platform. In another embodiment of the invention, a transverse bar is mounted on the pair of loading members pivotally connected to the back end of the trailer, when the loading members are in their raised position. The transverse bar is located beneath the upper vehicle so as to support the vehicle on the upper platform. In the preferred embodiment of the invention, a winch is provided to assist in loading and unloading the vehicles from the trailer.

BRIEF DESCRIPTION OF THE DRAWING

So that the manner in which the above recited features and advantages of the invention, as well as others which will become apparent to those skilled in the art, are obtained and can be understood in detail, a more particular description of the invention briefly summarized above may be had by reference to the embodiments thereof which are illustrated in the accompanying drawings, which drawings form a part of the specification and in which like numerals depict like parts in the several views. It is noted, however, that the appended drawing illustrate only a preferred embodiment of the invention and are therefore not be to considered limiting of its scope, for the invention may admit to other equally effective embodiments.

DETAILED DESCRIPTION OF THE INVENTION

Figure 1:
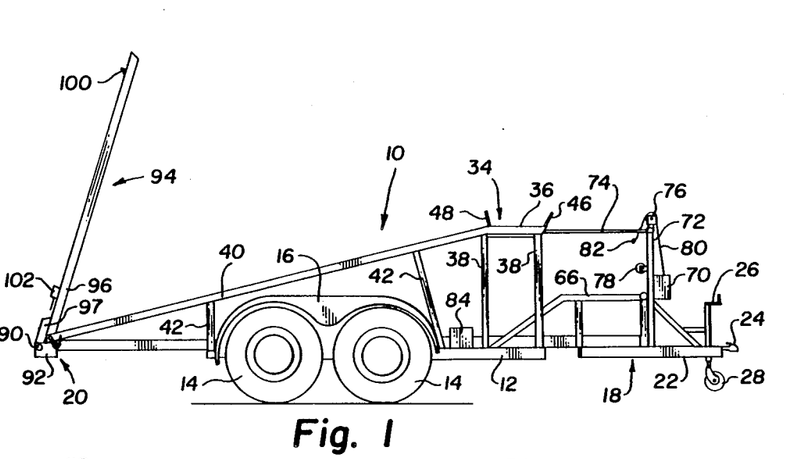
FIG. 1 is a side view of a dual load trailer constructed according to this invention.
Figure 2:
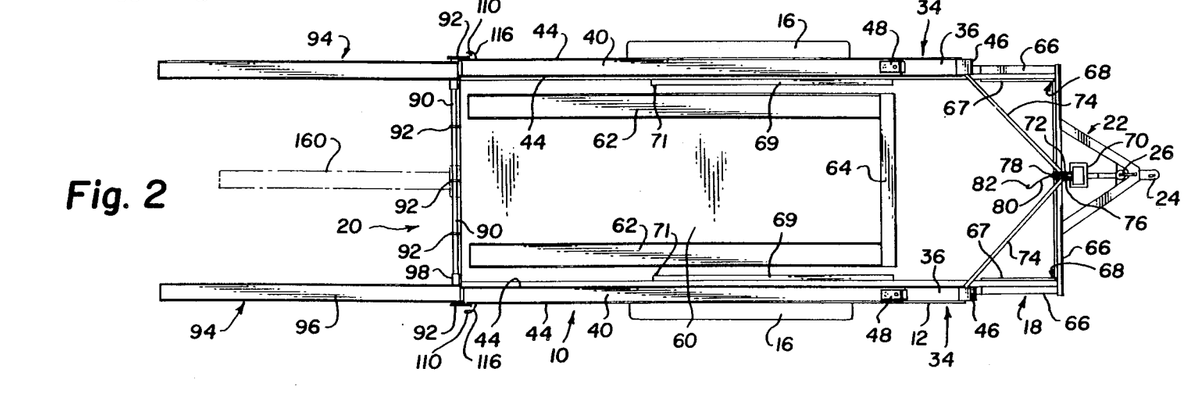
FIG. 2 is a top view of the trailer of FIG. 1.
Figure 3:
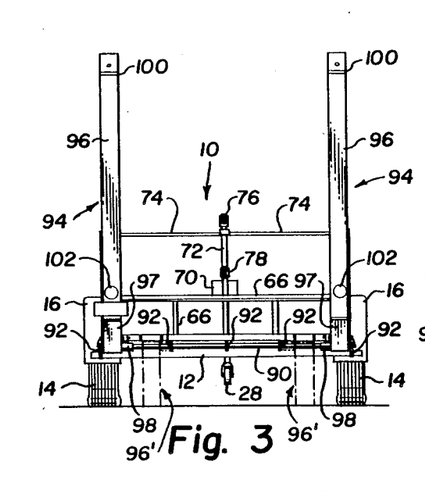
FIG. 3 is a back end view of the trailer of FIG. 1.

Referring now to FIGS. 1-3, there is shown dual load trailer 10 according to this invention. The trailer includes frame 12 which forms a rigid, generally rectangular structure of beams and trusses. Frame 12 is supported on wheels 14, with opposing pairs of wheels being connected to an axle (not shown) which is mounted on the under side of the frame. In the illustrated embodiment, two axles are provided for the two adjacent pairs of wheels. The wheels on either side of the frame are enclosed by fenders 16 mounted on the frame. The frame defines front end 18 and back end 20 of the trailer. The front end is adapted for attachment to a vehicle (not shown) for towing the trailer. Tongue 22 is mounted on the frame at the front end thereof and extends to conventional trailer hitch 24 for connection to a conventional mating member (not shown) on the towing vehicle (not shown). Crank 26 is mounted on the tongue adjacent the hitch and extends downwardly to wheel 28. When the trailer is being towed, the crank raises wheel 28 upwards to a retracted position, as shown. When the trailer is detached from the towing vehicle, the crank lowers wheel 28 to the ground to support the trailer in conjunction with wheels 14.

Upper platform 34 is provided to support one of the vehicles on the trailer. Upper platform 34 includes two laterally spaced, horizontal receptacles 36 supported on the farme by posts 38 adjacent the front end and along opposite edges of the frame. A pair of laterally spaced ramps 40 are also mounted on opposite edges of the frame by posts 42. The ramps are inclined toward the back end of the frame and each extends from one of the receptacles of the upper platform to the back edge of the frame. Continuous upwardly extending inner and outer flanges 44 are formed on the ramps and upper platform receptacles along the opposite edges and for substantially the full length thereof. The receptacles and the ramps are positioned to receive the wheels of the vehicle (not shown in FIGS. 1-3) that is to be loaded onto the upper platform. The upper platform includes front wheel stop 46 mounted on each receptacle and corresponding back wheel stop 48 that is removable and mounted on each ramp adjacent a receptacle. The front and back wheel stops on the upper platform secure the wheels of the vehicle on the upper platform when loaded onto the trailer. If desired, the upper platform could be constructed as a continuous surface extending transversely across the frame between the ramps.

Lower platform 60 is mounted on the frame below the upper platform and comprises a surface extending from the front to the back and to each side of the frame. The lower platform includes a pair of longitudinal wheel guide members 62 extending from the back end of the frame and terminating in transverse back stop 64 mounted on the lower platform. The wheel guide members are U-shaped channel members for receiving the wheels of the vehicle (not shown) to be loaded onto the lower platform and the back stop is provided to limit travel of the vehicle on the lower platform toward the front end of the frame. Barrier 66 is mounted on the front end of the frame forming a part of the frame and consists of a plurality of interconnected beams and posts for further securing a vehicle on the lower platform of the trailer. Alternatively the lower platform could be constructed of members mounted on the frame that support the wheel guide members and the wheel back stop, without enclosing the remainder of the space defined by the frame.

A pair of laterally spaced front support members 67 are pivotally mounted on the barrier at 68 and a pair of laterally spaced back support members 69 are pivotally mounted on the frame at 71 and all are used to secure the vehicle on the upper platform, as will be shown later.

Winch 70 is mounted on upright post 72 that is mounted on the front end of the frame. Braces 74 are mounted on one end to the upper platform and extend diagonally across to the upper end of post 72. First pulley 76 is rotatively mounted on the upper end of the post and second pulley 78 is rotatively mounted on the back side of the post intermediate the position of the winch and the first pulley. The winch includes cable 80 partially wound on the winch and terminating in hook 82. Winch 70 is used to load and unload the vehicles from the trailer, as will be explained in greater detail hereinafter. Although the winch could be mechanically actuated, in the illustrated embodiment of the invention, the winch is powered by an electric motor which is connected to battery 84 mounted on one side of the frame. Of course, the winch could be omitted and the first and second vehicles loaded and unloaded from the trailer manually, if desired.

The back end of the frame includes transverse bar 90 mounted on the frame by spaced brackets 92. A pair of loading members 94 are pivotally mounted on the back end of the frame and specifically to bar 90. As is shown in greater detail in FIGS. 7 and 7a, the loading members each includes elongated U-shaped member 96 terminating in offset bracket 97 attached to tube 98. The tube is in sliding engagement with bar 90 to enable the member to rotate between an upright position shown in FIGS. 1 and 3, and a lowered position, as shown in FIG. 2. The under side of each of the loading members includes flange 100 for contacting the ground when in a lowered position and to assist the loading member in supporting the vehicles as they are loaded and unloaded onto the trailer. Reflectors 102 are also mounted on the under side of the loading members for use when the loading members are in their raised position and the trailer is being towed.

The tube connecting each of the loading members to bar 90 not only enables pivotal movement of the loading members with respect to the trailer, but additionally enables the loading members to be slid transversely with respect to the trailer as well. Specifically, the loading members may be slid outwardly along the bar until the outer most set of brackets 92 are encountered. Conveniently, the outermost brackets are positioned so as to align the loading members with ramps 40 on the frame for loading and unloading a vehicle from the upper platform (as is shown in FIGS. 1-3). If the loading members are slid inwardly toward each other, they encounter a pair of brackets 92 that conveniently align the loading members with the guide members on the lower platform (as indicated at 96' in FIG. 3) for loading and unloading a vehicle from the lower platform. Of course, it is possible to permanently connect the loading members in alignment with either the ramps or the guide members, or to provide detachable loading members (not shown) for use in loading and unloading vehicles from the upper and lower platforms.

Figures 7, 8, 9:
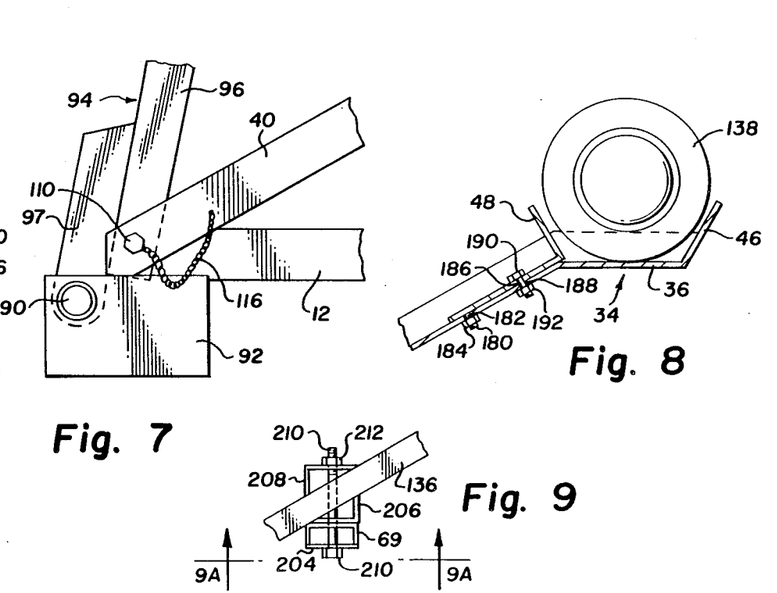
FIG. 7 is a detailed side view of a portion of one of the loading members of FIG. 1.
FIG. 8 is a detailed view in cross section of a portion of the upper platform of the trailer of FIG. 5.
FIG. 9 is a detailed top view along view 9—9 of FIG. 5 of the upper end of one of the support members.
Figure 7A:
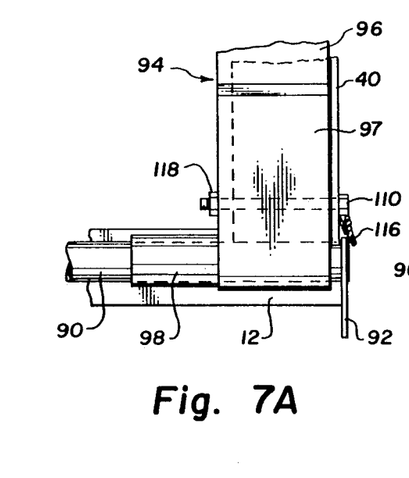
FIG. 7a is a back end view of a portion of the loading member of FIG. 7.

As is also shown in FIGS. 7 and 7a, means are provided to secure the loading members in a raised position for transporting the trailer and the vehicle loaded thereon. The securing means takes the form of pin 110 extending through aligned holes in the flanges of the ramp and the loading member, respectively. One end of the pin may be attached to cable 116 that is also mounted on the frame so that the pins will not be misplaced when removed from the loading members and the ramps. The other end of the pin may be secured in place such as by nut 118 threadedly attached thereto, a cotter pin, or by any other conventional means. In order for the loading members to be lifted into their raised position and to align their respective holes, the loading members must be shifted slightly inward so that the respective flanges on the ramps and the loading members do not interfere with each other.

Figure 4:
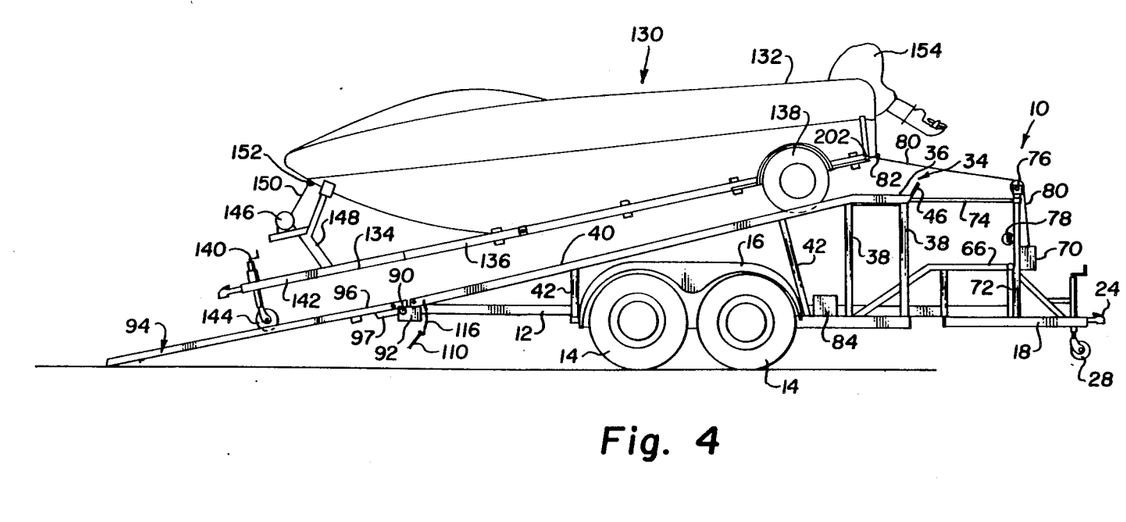
FIG. 4 is a side view of the trailer of FIG. 1 with a boat and boat trailer partially loaded thereon.

In operation, the trailer is shown in FIG. 4 with vehicle 130 partially loaded onto the upper platform. Vehicle 130 is illustrated as boat 132 carried on boat trailer 134. Boat trailer 134 includes frame 136 and wheels 138 mounted on an axle (not shown) for supporting the boat and for independently transporting the boat in a conventional manner. Crank 140 is mounted on tongue 142 of the trailer and raises and lowers wheel 144 as needed. Winch 146, which may be mechanically actuated, is mounted on member 148 and includes cable 150 terminating in hook 152 for attachment to the front end of the boat. Motor 154 is mounted on the back end of the boat and represents a substantial proportion of the weight of the boat. The axle and wheels are mounted on the boat trailer adjacent the motor and the back end of the boat trailer. Cable 80 on the trailer is attached to the back end of boat trailer 134 by hook 82. Winch 70 pulls boat 132 and boat trailer 134 backwards up the loading members when in a lowered position and shifted outwardly so as to be aligned with ramps 40. The trailer of this invention further includes detachable ramp 160, shown in position in FIG. 2 and in detail in FIG. 11. Ramp 160 includes U-shaped channel member 162 and longitudinal reinforcing bar 164 mounted to the under side of the U-shaped channel member. One end of the U-shaped channel member is mounted to a hemi-cylindricaly shaped transverse member 166. The hemi-cylindrically shaped member is adapted to engage bar 90 on the trailer to support the ramp 160 in an inclined position from the back end of the trailer to the ground. Slot 168 is formed in the hemi-cylindrical member to accommodate center bracket 92 on the trailer and to align ramp 160 with wheel 144 on the boat trailer, while wheels 138 on the boat trailer are aligned with loading members 94 and ramps 40 of the trailer. When not in use, ramp 160 may be detached from the bar and stored, such as by mounting on one of the ramps 40 of the trailer, once the upper vehicle has been loaded onto the upper platform.

As shown in FIG. 4, back wheel stops 48 have been removed from the ramps so as to enable the boat trailer to be pulled up the ramps 40 to the upper platform. In FIG. 8, one of the wheels 138 of the boat trailer is shown in position on receptacle 36 of the upper platform adjacent front wheel stop 46. Back wheel stop has been placed on the ramp adjacent the receptacle. Back wheel stop is attached to the ramp by threaded stud 180 mounted on the under side of the back wheel stud and inserted through aligned hole 182 in the ramp and secured by nut 184 on the under side of the ramp. Bolt 190 is inserted through the aligned holes 186 in the back wheel stop and hole 188 in the ramp and is secured by nut 192. Once both of the back wheel stops are mounted on the ramps, and the wheels of the boat trailer are positioned in the receptacles of the upper platform, the boat is securely held in place on the trailer.

Figure 5:
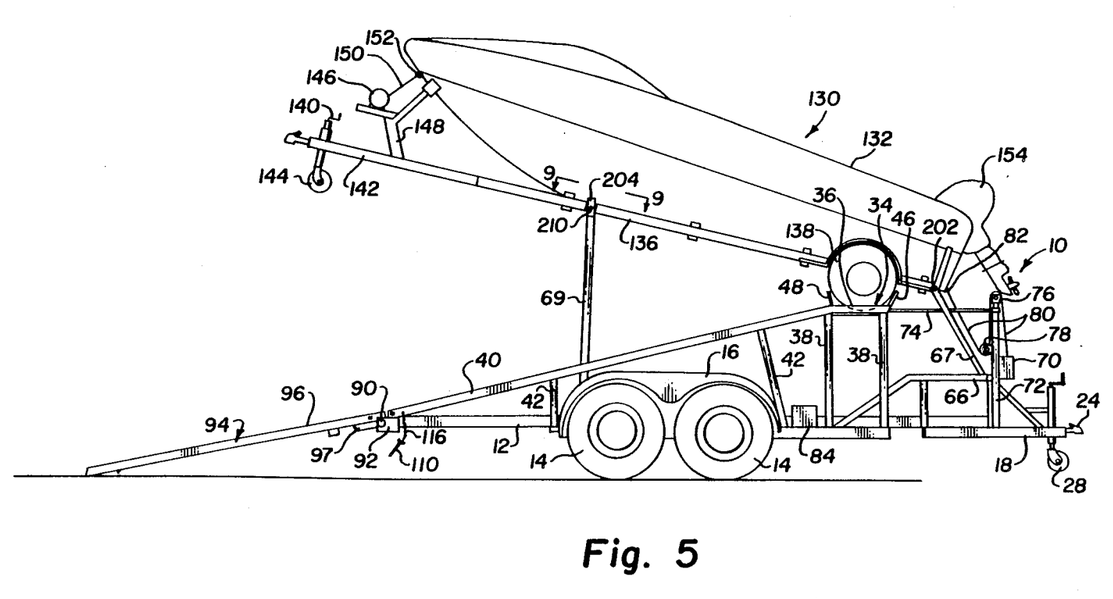
FIG. 5 is a side view of the trailer of FIG. 4 with the boat trailer loaded on the upper platform.

Turning now to FIG. 5, the boat has been raised to allow a vehicle to be loaded onto the lower platform. Winch 70 is used to raise the front end of the boat. However, first pulley 76 is not positioned effectively to allow the winch to raise the boat and boat trailer. Therefore, once the boat trailer has been loaded onto the upper platform and secured with the back wheel stops, cable 80 is detached from the boat trailer and passed around second pulley 78 and then reattached to the back of the boat trailer. The lower location of second pulley 78 enables the winch to exert a downward force on the boat trailer, which pivots about wheels 138 so as to raise the front end or tongue of the boat.

Figure 9A:
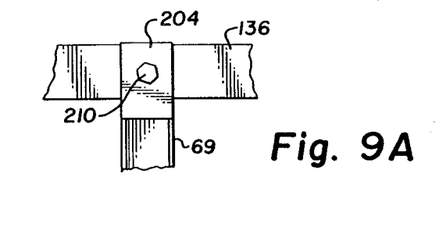
FIG. 9a is a side view of the support member of FIG. 9.

Means are provided to support the boat and boat trailer in its raised position. The support means includes front support members 67 pivotally mounted on barrier 66 at one end, as previously described. The other end of the front support members are adapted for attachment to the boat trailer. For instance, the boat trailer may include outwardly extending threaded studs 202 and the other end of the front support members includes aligned holes through which the threaded studs on the boat trailer may be inserted and secured by nuts or by any other conventional means. Additional support for the boat in its raised position is provided by back support members 69 which are pivotally attached at one end to the frame, as previously described. The other end of the back support members are adapted for attachment to the upper vehicle, such as by the structure shown in FIGS. 9 and 9a. The back support members comprise a U-shaped channel member having plate 204 attached thereto for a short length adjacent the end to be attached to the upper vehicle. Aligned holes are formed in the plate and the channel member 69. Complementary flanges 206 and 208 are mounted on opposite sides of the inclined tongue 142 of the boat trailer, so as to present outside surfaces that are parallel to each other and to the back support member and plate 204, when raised and placed adjacent the boat trailer. The flanges and the tongue of the boat trailer all include holes aligned with each other and to the holes in the back support member and the plate. Bolt 210 is inserted through all of the aligned holes in the plate, U-shaped channel member, flanges and trailer frame, and is secured such as by nut 212. With the front and back support members attached to the upper vehicle, the vehicle is secured to the trailer, even if the cable on the winch breaks or is removed.

Figure 6:
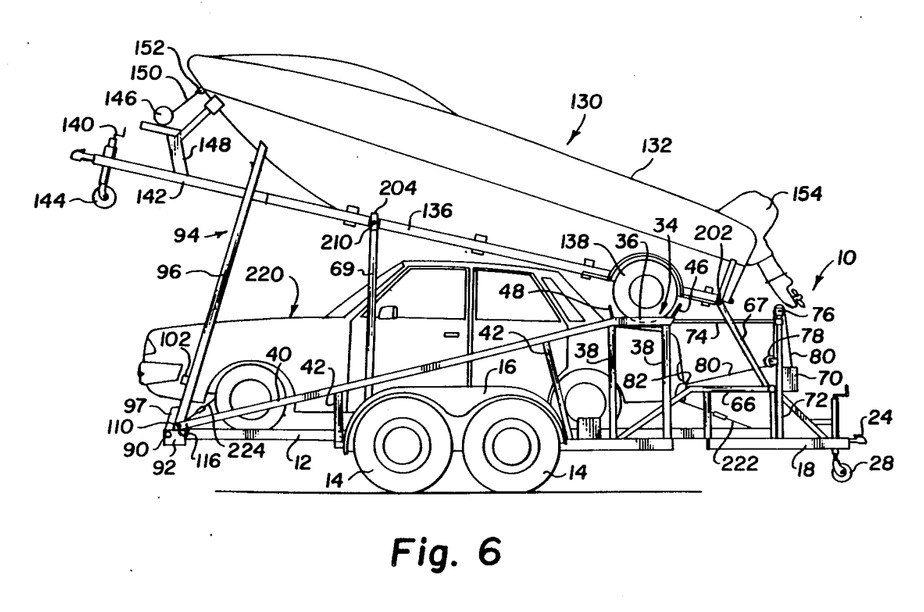
FIG. 6 is a side view of the trailer of FIG. 5 with an automobile loaded onto the trailer.

FIG. 6 shows the trailer with lower vehicle 220, which is illustrated as an automobile, loaded onto the lower platform of the trailer. This is accomplished by detaching cable 80 from the boat trailer and, while still engaged with second pully 78, extending the cable to the automobile and attaching the cable thereto. The loading members are shifted inward so as to be in alignment with the guide members on the lower platform (as indicated in FIG. 3) and the automobile pulled up the loading members onto the lower platform with the tires of the automobile in the guide members and back into contact with back stop 64. The automobile is secured in place on the lower platform by front shackles 222 and back shackles 224, each attached to the trailer at one end and attached to the automobile at the other end. The automobile and the boat are easily unloaded from the trailer by reversing the above described loading procedure. It may be found convenient to use crank 26 to raise the tongue of the trailer during unloading of the vehicles so as to reduce the force required to move the vehicles.

In an automobile in which the engine is mounted in the front of the automobile, the center of gravity will be shifted toward the front of the automobile. In the case of the boat and boat trailer, the engine mounted on the back end of the boat trailer shifts the center of gravity towards the back of the boat trailer. In this situation, the preferred arrangement is to place the boat and automobile both facing the back end of the trailer so as to balance the load on the trailer. Of course, if the engine of the automobile is mounted in the back of the automobile, the orientation of the automobile on the trailer would be reversed. The placement of the boat facing the back end of the trailer also has the advantage of allowing the profile of the trailer to be lowered as compared to conventional dual load trailer designs. This is accomplished by lowering the upper platform so that the boat trailer is inclined towards the front of the trailer. In this position, the wheels of the boat trailer are preferably at least partially below the top of the automobile. It is also evident that the wheels of the boat trailer must be wider than the width of the automobile, in order for the spacing of the ramps and upper platform to accommodate the automobile on the lower platform. Therefore, the wheels of the boat trailer may be positioned to straddle the automobile and thus permit further lowering of the profile of the trailer. Each of these factors contribute to the overall reduction in the profile of the trailer. Thus, the center of gravity of the trailer loaded with the vehicles is lowered and the stability increased. The wind resistance of the loaded trailer is likewise reduced so as to increase the fuel efficiency of the towing vehicle. Finally, the clearance of the loaded trailer is improved with the reduction in overall height. None of these advantages are appreciated by the conventional dual load trailer designs.

Figure 10:
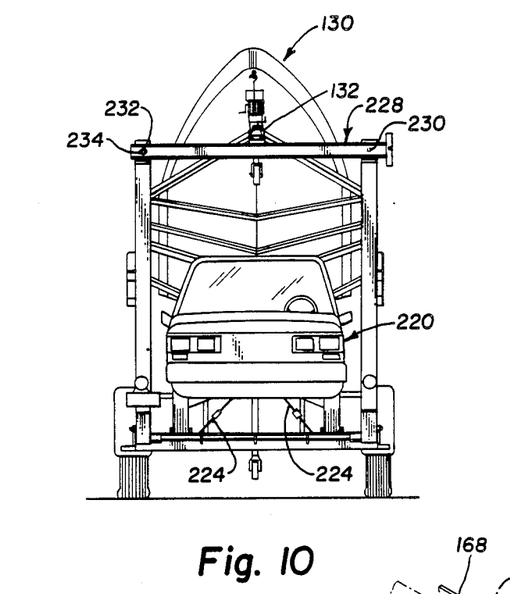
FIG. 10 is a back end view of an alternate embodiment of this invention in which a transverse bar is secured to the loading members to support the vehicle on the upper platform.
Figure 11:
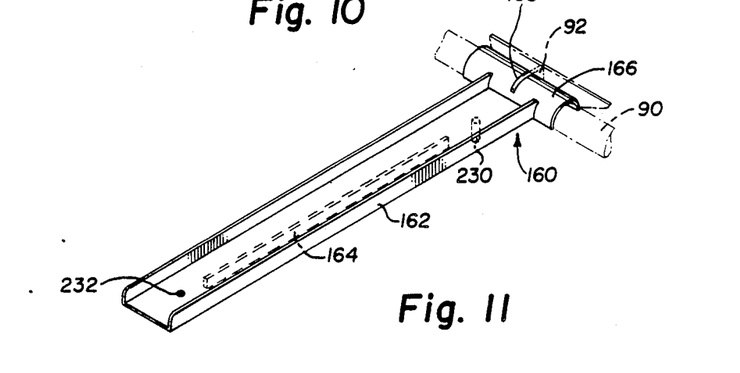
FIG. 11 is a detailed view of the transverse bar of the trailer of FIG. 10 and of the detachable ramp of FIG. 3.

FIG. 10 illustrates an alternate embodiment of the invention in which the front and back support members are not utilized to support the upper vehicle on the upper platform. Instead, a transverse support member (indicated as 228 in FIG. 10) is mounted at either end to the loading members when in a raised position. The transverse member is then situated beneath the boat trailer. The transverse member may conveniently take the form of the detachable ramp 160, which may be used after the boat has been loaded onto the upper platform. To that end, and as shown in FIG. 11, the detachable ramp includes threaded stud 230 mounted on its under side. Hole 232 is formed on the other end of the U-shaped channel at a distance equal to the lateral spacing of the loading members when shifted to the outward edges of bar 90 (that is, when aligned with the ramps on the trailer). Aligned holes are formed in the upper end of the loading members (shown in FIG. 3). When the transverse member is placed in position on the loading members, threaded stud 230 is inserted through the hole in one of the loading members, where it may be secured by a nut (not shown) or the like. Hole 232 in the other end of the transverse member is aligned with the hole in the other loading member so that bolt 234 may be inserted therethrough and secured by a nut (not shown) or the like. In this manner, the trailer of this invention may be used with a boat trailer or other vehicle that has not been modified with the flanges 206 and 208 mounted on the tongue for use with the back support members or threaded studs 202 mounted on the back end of the trailer for use with the front support members.

Although the invention has been disclosed above, with regard to particular and preferred embodiments, these are advanced for illustrative purposes only, and are not intended to limit the scope of this invention. Although descibed as a dual load trailer, it is within the spirit and scope of the invention for the lower platform to support multiple vehicles, such as motorcyles, bicycles, snowmobiles or the like, to the extend allowed by the dimensions of the trailer. Further, the term "vehicle" as used in this application is not limited to wheeled vehicles as specifically mentioned herein, whether or not self powered, but also includes all other forms of vehicles as well. For instance, it is within the scope of this invention that an automobile, tent trailer, camper or the like is supported on the upper platform in an inclined position, and a boat is supported on the lower platform. In this embodiment, a boat trailer may be permanently affixed and incorporated into the lower platform for mounting the boat thereon. These variations remain within the invention as claimed below.

What is claimed is:

1. A dual load trailer for simultaneously transporting a first vehicle having a pair of laterally spaced vehicle wheels defining a transverse axis of rotation and a second vehicle, comprising:
   (a) a rigid frame having a front end and a back end;
   (b) a trailer coupling means mounted on said front end of said frame;
   (c) at least one axle mounted on said frame, each of said at least one axle having at least one wheel axially mounted on either end thereof for supporting the trailer and the first and the second vehicles when loaded thereon;
   (d) a lower platform mounted on said frame for supporting the second vehicle thereon;
   (e) an upper platform mounted on said frame above said lower platform and the second vehicle when supported on said lower platform, said upper platform for supporting the first vehicle thereon with the first vehicle facing said front end of said frame;
   (f) ramp means mounted on said frame for loading and unloading the first vehicle from said upper platform and the second vehicle from said lower platform;
   (g) means for securing the first vehicle on said upper platform and for securing the second vehicle on said lower platform; and
   (h) winch means mounted on said frame and including a cable for connection to the first vehicle and to the second vehicle for loading and unloading the first vehicle onto said upper platform and a second vehicle onto said lower platform, further wherein said winch means rotates the first vehicle about said axis of rotation defined by said vehicle wheels when the first vehicle is loaded onto said upper platform so as to incline the first vehicle toward the front end of said frame.

2. A dual load trailer for simultaneously transporting a first and a second vehicle, comprising:
   (a) a rigid frame having a front end and a back end;
   (b) a trailer coupling means mounted on said front end of said frame;
   (c) at least one axle mounted on said frame, each of said at least one axle having at least one wheel axially mounted on either end thereof for supporting the trailer and the first and the second vehicles when loaded thereon;
   (d) a lower platform mounted on said frame for supporting the second vehicle thereon;
   (e) an upper platform mounted on said frame above said lower platform and the second vehicle when supported on said lower platform, said upper platform for supporting the first vehicle thereon with the first vehicle being inclined towards said front end of said frame;
   (f) a pair of inclined ramp members mounted on said frame and extending from said upper platform to said back end of said frame, said ramp members being laterally spaced equal to the spacing between the wheels of the first vehicle;

(g) a pair of laterally spaced loading members, each pivotally mounted at one end to said back end of said frame in alignment with one of said ramp members, said loading members being shiftable between a lowered position extending from said frame to the ground for support of the first vehicle and loading the first vehicle onto said upper platform, and a raised position for transporting the first and second vehicles on the trailer;

(h) means for locking said loading members in said raised position while transporting the first and second vehicles; and (i) means for securing the first vehicle on said upper platform and for securing the second vehicle on said lower platform.

3. The dual load trailer of claim 2, wherein said ramp means further comprises a means for laterally shifting said loading members so as to be in alignment with the wheels of the second vehicle for loading and unloading the second vehicle onto said lower platform.

4. The dual load trailer of claim 2, wherein the first vehicle is a boat mounted on a boat trailer having a tongue and a wheel mounted on the tongue, wherein said ramp means further includes a detachable ramp adapted for connection to said back end of said frame intermediate said loading members and in alignment with the wheel of the boat trailer for loading and unloading the boat and boat trailer from said upper platform.

5. The dual load trailer of claim 1 wherein the second vehicle includes a pair of laterally spaced wheels, and wherein said lower platform comprises:

(a) a horizontal surface mounted on said frame;

(b) a pair of laterally spaced longitudinally guide members mounted on said surface and adapted to receive the wheels of the second vehicle when loaded onto said surface;

(c) a transverse back stop member mounted on said surface adjacent a front end of each of said guide members for limiting forward movement of the second vehicle on said lower platform.

6. The dual load trailer of claim 2, wherein said upper platform comprises:

a pair of laterally spaced receptacles mounted on said frame above said lower platform, each of said receptacles being in alignment with one of said ramp members for receipt of the wheels of the first vehicle.

7. The dual load trailer of claim 6, wherein said securing means for the first vehicle comprises:

(a) a front wheel stop mounted on a front end of each of said receptacles; and (b) a back wheel stop mounted on each of said ramp members adjacent said receptacles, for securing the wheels of first vehicle on said receptacles of said upper platform.

8. The dual load trailer of claim 7, wherein said securing means further comprises:

at least one pair of laterally spaced support members, each of said at least one pair of support members being pivotally mounted on one end to said frame and adapted on another end for connection to the first vehicle so as to support the first vehicle on said upper platform.

9. The dual load trailer of claim 2, wherein said securing means for the first vehicle comprises a transverse beam mounted at each end of said loading members beneath the first vehicle when said loading members are in said raised position, for supporting the first vehicle on said upper platform.

10. A dual load trailer for transporting a first vehicle having a pair of laterally spaced vehicle wheels defining a transverse axis of rotation and a second vehicle comprising:

(a) a rigid, generally rectangular frame having a front end and a back end;

(b) a tongue mounted on said front end of said frame and including trailer coupling means;

(c) at least one axle mounted on said frame, each of said at least one axle having at least one wheel axially mounted on either end thereof for supporting the trailer and the first and the second vehicles when loaded thereon;

(d) a lower platform mounted on said frame and adapted for supporting the second vehicle thereon;

(e) an upper platform, including a pair of laterally spaced receptacles mounted on said frame above said lower platform for supporting the first vehicle with at least a portion of the first vehicle below the top of the second vehicle;

(f) at least one pair of laterally spaced support members each pivotally mounted on one end to opposite sides of said frame and having a second end adapted for connection to the first vehicle so as to support the first vehicle on said upper platform;

(g) a pair of inclined, laterally spaced ramp members, each mounted on said frame and in alignment with one of said upper platform receptacles, said ramp members extending from said receptacles to said back end of said frame for loading and unloading the first vehicle from said upper platform;

(h) means for securing the first vehicle on said upper platform and the second vehicle on said lower platform; and (i) winch means mounted on said frame and including a cable for connection to the first vehicle and to the second vehicle for loading and unloading the first vehicle onto said upper platform and a second vehicle onto said lower platform, further wherein said winch means rotates the first vehicle about the axis of rotation defined by said vehicle wheels when the first vehicle is loaded onto said upper platform so as to incline the first vehicle toward the front end of said frame.

11. The dual load trailer of claim 10, further comprising winch means mounted on said frame and including a cable adapted for connection to the first vehicle and the second vehicle for loading and unloading the first vehicle onto said upper platform and the second vehicle onto said lower platform.

12. A dual load trailer for transporting a first vehicle and a second vehicle, comprising:

(a) a rigid, generally rectangular frame having a front end and a second end;

(b) a tongue mounted on said front end of said frame and including trailer coupling means;

(c) at least one axle mounted on said frame, each of said at least one axle having at least one wheel axially mounted on either end thereof for supporting the trailer and the first and the second vehicles when loaded thereon;

(d) a lower platform mounted on said frame and adapted for supporting the second vehicle thereon;

(e) an upper platform, including a pair of laterally spaced receptacles mounted on said frame above said lower platform for supporting the first vehicle inclined towards said front end of said frame and with at least a portion of the first vehicle below the top of the second vehicle;

(f) at least one pair of laterally spaced support members each pivotally mounted on one end to opposite sides of said frame and having a second end adapted for connection to the first vehicle so as to support the first vehicle on said upper platform;

(g) a pair of inclined, laterally spaced ramp members, each mounted on said frame and in alignment with one of said upper platform receptacles, said ramp members extending from said receptacles to said back end of said frame for loading and unloading the first vehicle from said upper platform;

(h) means for securing the first vehicle on said upper platform and the second vehicle on said lower platform;

(i) a pair of laterally spaced loading members, each pivotally mounted at one end to said back end of said frame in alignment with one of said ramp members, said loading members being shiftable between a lowered position extending from said frame to the ground for loading the first vehicle onto said upper platform, and a raised position for transporting the first and second vehicles on the trailer; and (j) means for locking said loading members in said raised position while transporting the first and second vehicles.

13. The dual load trailer of claim 12, further comprising means for laterally shifting said loading members so as to be in alignment with the wheels of the second vehicle for loading and unloading the second vehicle from said lower platform.

14. The dual load trailer of claim 10, wherein said securing means for the first vehicle on said upper platform, comprises:

(a) a front wheel stop mounted on a front end of each of said receptacles; and (b) a back wheel stop mounted on each of said ramp members adjacent said receptacles whereby said front wheel stops and said rear wheel stops cooperate to secure the first vehicle on said receptacles of said upper platform.

15. A dual load trailer for simultaneously transporting a first vehicle having a pair of laterally spaced vehicle wheels defining a transverse axis of rotation and second vehicle, comprising:

(a) a rigid frame having a front end and a back end;

(b) a trailer coupling means mounted on said front end of said frame;

(c) at least one axle mounted on said frame, each of said at least one axle having at least one wheel axially mounted on either end thereof for supporting the trailer and the first and the second vehicles when loaded thereon;

(d) a lower platform mounted on said frame for supporting the second vehicle;

(e) an upper platform mounted on said frame above said lower platform and the second vehicle when supported on said lower platform, said upper platform for supporting the first vehicle with at least a portion of the first vehicle below the top of the second vehicle;

(f) ramp means mounted on said frame for loading and unloading the first vehicle from said upper platform and the second vehicle from said lower platform;

(g) means for securing the first vehicle on said upper platform and for securing the second vehicle on said lower platform; and (h) winch means mounted on said frame and including a cable for connection to the first vehicle and to the second vehicle for loading and unloading the first vehicle onto said upper platform and a second vehicle onto said lower platform, further wherein said winch means rotates the first vehicle about the axis of rotation defined by said vehicle wheels when the first vehicle is loaded onto said upper platform so as to incline the first vehicle toward the front end of said frame.

16. A dual load trailer for simultaneously transporting a first vehicle having a pair of laterally spaced vehicle wheels defining a transverse axis of rotation and second vehicle, comprising:

(a) a rigid frame having a front end and a back end;

(b) a trailer coupling means mounted in said front end of said frame;

(c) at least one axle mounted on said frame, each of said at least one axle having at least one wheel axially mounted on either end thereof for supporting the trailer and the first and the second vehicles when loaded thereon;

(d) a lower platform mounted on said frame for supporting the second vehicle;

(e) an upper platform mounted on said frame above said lower platform and the second vehicle when supported on said lower platform, said upper platform for supporting the first vehicle with the wheels of the first vehicle straddling the second vehicle;

(f) ramp means mounted on said frame for loading and unloading the first vehicle from said upper platform and the second vehicle from said lower platform;

(g) means for securing the first vehicle on said upper platform and for securing the second vehicle on said lower platform; and (h) winch means mounted on said frame and including a cable for connection to the first vehicle and to the second vehicle for loading and unloading the first vehicle onto said upper platform and a second vehicle onto said lower platform, further wherein said winch means rotates the first vehicle about the axis of rotation defined by said vehicle wheels when the first vehicle is loaded onto said upper platform so as to incline the first vehicle toward the front end of said frame.

17. The combination comprising:

(a) a first vehicle;

(b) a second vehicle having a pair of laterally spaced vehicle wheels defining a transverse axis of rotation; and (c) a trailer, said trailer including
a rigid frame having a front end and a back end,
a trailer coupling means mounted on said front end of said frame,
at least one axle mounted on said frame, each of said at least one axle having at least one wheel axially mounted on either end thereof for supporting said trailer and said first and said second vehicles when loaded thereon,
a lower platform mounted on said frame for supporting said second vehicle thereon,
an upper platform mounted on said frame above said lower platform and said second vehicle, said upper platform for supporting said first vehicle above said second vehicle, ramp means mounted on said frame for loading and unloading said first vehicle from said upper platform and said second vehicle from said lower platform, and means for securing said first vehicle on said upper platform and for securing said second vehicle on said lower platform, and winch means mounted on said frame and including a cable for connection to the first vehicle into the second vehicle for loading and unloading the first vehicle onto said lower platform and a second vehicle onto said lower platform, further wherein said winch means rotates the first vehicle about said axis of rotation defined by said vehicle wheels when the first vehicle is loaded onto said upper platform so as to incline the first vehicle toward the front end of said frame.

18. The combination comprising:
(a) a first vehicle having a pair of laterally spaced vehicle wheels defining a transverse axis of rotation;
(b) a second vehicle; and
(c) a trailer, said trailer including
a rigid frame having a front end and a back end,
a trailer coupling means mounted on said front end of said frame,
at least one axle mounted on said frame, each of said at least one axle having at least one wheel axially mounted on either end thereof for supporting said trailer and said first and said second vehicles when loaded thereon,
a lower platform mounted on said frame for supporting said second vehicle thereon,
an upper platform mounted on said frame above said lower platform and said second vehicle, said upper platform for supporting said first vehicle above said second vehicle with said first vehicle inclined towards said front end of said frame,
a pair of inclined ramp members mounted on said frame and extending from said upper platform to said back end of said frame, said ramp members being laterally spaced equal to the spacing between said wheels of said first vehicle,
a pair of laterally space loading members, each pivotally mounted at one end to said back end of said frame in alignment with one of said ramp members, said loading members being shiftable between a lowered position extending from said frame to the ground for support of said first vehicle and loading said first vehicle onto said upper platform, and a raised position for transporting said first and said second vehicles on the trailer; and means for locking said loading members in said raised position while transporting said first and said second vehicles, and winch means mounted on said frame and including a cable for connection to the first vehicle into the second vehicle for loading and unloading the first vehicle onto said upper platform and a second vehicle onto said lower platform, further wherein said winch means rotates the first vehicle about said axis of rotation defined by said vehicle wheels when the first vehicle is loaded onto said upper platform so as to incline the first vehicle toward the front end of said frame.

19. The combination of claim 18 wherein said lower platform comprises:
(a) a horizontal surface mounted on said frame;
(b) a pair of laterally spaced longitudinal guide members mounted on said surface for receiving said wheels of said second vehicle when loaded onto said surface;
(c) a transverse back stop member mounted on said surface adjacent a front end of each of said guide members for limiting forward movement of said second vehicle on said lower platform.

20. The combination of claim 18, wherein said upper platform comprises:
a pair of laterally spaced receptacles mounted on said frame above said lower platform, each of said receptacles being in alignment with one of said ramp members, for receipt of the wheels of the first vehicle for loading the first vehicle on said upper platform.

21. The combination of claim 20, wherein said securing means for said first vehicle comprises:
(a) a front wheel stop mounted on a front end of each of said receptacles; and
(b) a back wheel stop mounted on each of said ramp members adjacent said receptacles, for securing said wheels of said first vehicle on said receptacles of said upper platform.

22. The combination of claim 21, wherein said securing means further comprises:
at least one pair of laterally spaced support members, each of said at least one pair of support members being pivotally mounted on one end to said frame and adapted on another end for connection to said first vehicle so as to support said first vehicle on said upper platform.

* * * * *